United States Patent [19]

Jensen et al.

[11] 3,898,658
[45] Aug. 5, 1975

[54] ACCELERATION AND VELOCITY MATCHING LO GENERATOR

[75] Inventors: Garold K. Jensen, Alexandria, Va.; James E. McGeogh, Silver Spring, Md.

[73] Assignee: The United States of America as represented by the Secretary of the Navy, Washington, D.C.

[22] Filed: Apr. 2, 1969

[21] Appl. No.: 812,939

[52] U.S. Cl. .................... 343/8; 343/5 SA; 343/7.7
[51] Int. Cl.² .......................................... G01S 9/44
[58] Field of Search ............ 343/5 R, 7.7, 8, 17.1 R, 343/5 SA

[56] References Cited
UNITED STATES PATENTS

| 3,386,093 | 5/1968 | Mooney et al. | 343/7.7 |
| 3,587,097 | 6/1971 | Stull | 343/7.7 X |
| 3,855,595 | 12/1974 | Jensen et al. | 343/7.7 |

*Primary Examiner*—T. H. Tubbesing
*Attorney, Agent, or Firm*—R. S. Sciascia; Arthur L. Branning

[57] ABSTRACT

An oscillator system particularly suited for use in radar signal processing. A fixed frequency spectrum, related to the radar transmitted pulse, is combined with incremental variations of frequency, related to different target velocity doppler frequencies, and with positive and negative frequency sweeps of different slopes which are representative doppler frequency variations of different target accelerations.

7 Claims, 4 Drawing Figures

3,898,658

ACCELERATION AND VELOCITY MATCHING LO GENERATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Following World War II, much effort was devoted by this nation to the development of long range, over-the-horizon (o-t-h) radar. In these pioneer o-t-h systems, the design of the signal storage and display systems was related, in terms of range increments and doppler filtering channels, to the anticipated targets of that period, that is, to manned aircraft having velocities and accelerations which are small when compared to the performance parameters of present day missile targets.

Characteristically, the signal storage of these pioneer radars comprised a magnetic drum which was divided into 23 sectors or range bins. Echo signals were continuously sampled at 23 ranges and the samples inserted into the drum in such a manner that as new samples were added the older signals were removed. Because it was sufficient for the needs of the period and reflecting the then current state of the art of information retrieval, the several second stored signal content of each range bin was read out in sequence and with narrow banding techniques to enhance the signal-to-noise ratio (S/N). These techniques, which essentially consisted of combining short signal samples, are described more fully in U.S. Pat. No. 3,274,594 issued on Sept. 20, 1966 to R. M. Page for SIGNAL INTEGRATING RADAR SYSTEM. Those target signals which were recovered were separated both by range and by doppler characteristics into velocity bins.

The advent of the ICBM rendered these pioneer o-t-h radars obsolete. These missiles, because of their great speeds and accelerations, require the radar to have both a faster rate of signal processing and also an increased range, i.e. the recovery of weaker signals. This latter requirement necessitates longer integration times which, when coupled with the high missile velocity and accelerations, has the undesirable result that the return from a single target is no longer contained in a single veocity bin but the energy thereof is "smeared" into several velocity bins and the signal out of the receiver will be folded at multiples of PRF/2.

Modern o-t-h radar, such as the Naval Research Laboratory experimental MADRE radar, often include an improvement of the type commonly called acceleration gates, such as described in patent application, Ser. No. 285,555 for RADAR SYSTEM filed on May 31, 1963 by Garold K. Jensen and James E. McGeogh, wherein an attempt is made to match the acceleration pattern of the target and thereby to put all (or most of) the target echo energy in a single velocity bin.

SUMMARY OF THE INVENTION

The present invention is an improvement to the above described modern o-t-h radars wherein the (acceleration gate) pattern matching becomes quite difficult because of the spectral folding which occurs when the doppler frequency exceeds one half of the pulse repetition frequency (PRF/2) as it does with high velocity missiles. The improvement consists in providing an oscillator system wherein a fixed frequency spectrum is combined with a variable sweep rate signal to duplicate the spectral folding of an accelerating high velocity target and can be further combined with a plurality, such as 100, constant frequency signals and thereby allow the use of a plurality, such as 100, or paralleled velocity analyzer channels and an accompanying rapidity of signal processing.

OBJECTS OF THE INVENTION

It is, accordingly, an object of this invention to provide an improved oscillator system which is particularly suitable for use with an o-t-h radar.

Another object is to provide an improved oscillator system wherein a fixed frequency spectrum is combined with a variable sweep rate signal.

Yet another object is the provision of an improved oscillator system wherein a fixed frequency spectrum is combined with a variable sweep rate signal to duplicate the signal spectral folding that occurs in the radar receiver when the doppler frequency exceeds one half of the pulse repetition frequency.

A still further object is the provision of an improved oscillator system wherein a fixed frequency spectrum and a variable sweep rate signal are combined with a plurality of constant frequency signals to produce signals which can be used to match the spectral folding signals that occur in the radar receiver when the doppler frequency exceeds one half of the pulse repetition frequency.

DESCRIPTION OF THE DRAWINGS

With these and other objects in view, as will hereinafter more fully appear, and which will be more particularly pointed out in the appended claims, reference is now made to the following description taken in connection with the accompanying drawings in which:

DESCRIPTION OF THE INVENTION

Figure 1:
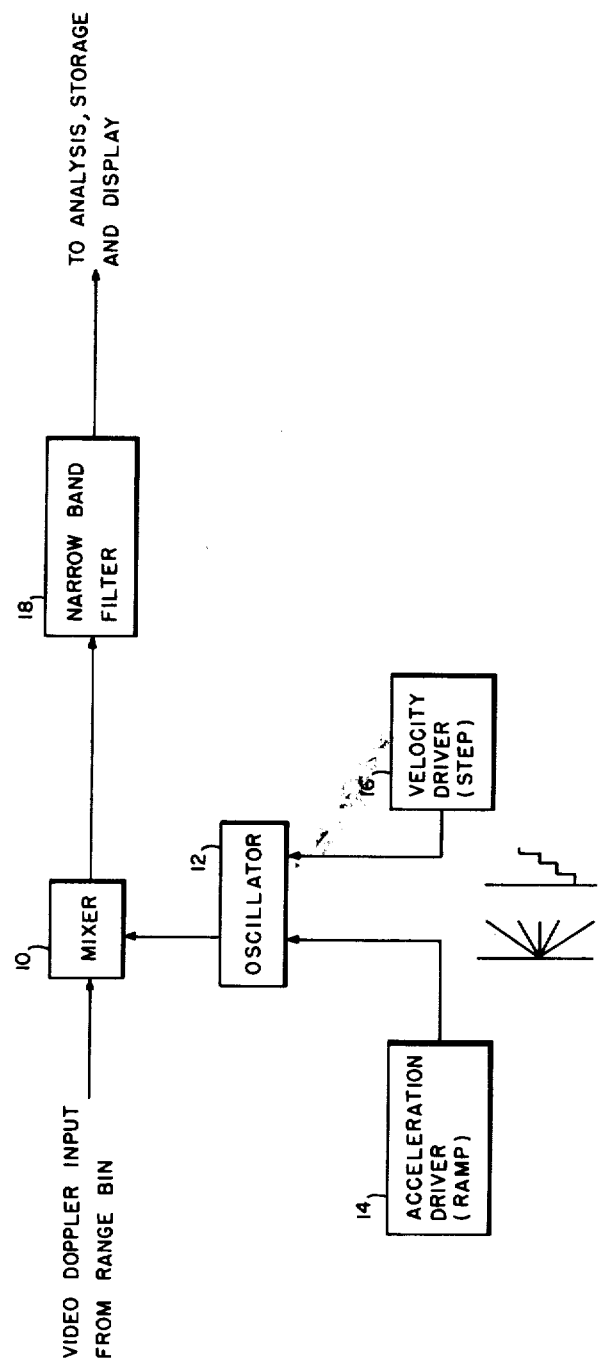
FIG. 1 illustrates a prior art acceleration gate.

Referring now to the drawings, wherein like reference characters designate like or corresponding parts throughout the several views, there is shown in FIG. 1 a simplified block diagram of an acceleration gate of the type which has been widely used in o-t-h radar. As shown in FIG. 1 the echo signals stored in the radar range bins are applied as video doppler signals to a mixer 10 wherein they are heterodyned with a signal from the oscillator 12 which is varied both by ramp signals from the acceleration driver 14 and by step signals from the velocity driver 16. The output of the mixer 10 is connected to a narrow band filter 18. The narrow banding by filter 18 separates a signal in the pass band from adjacent noise and, as is well known, the improvement of the S/N allows the subsequent recovery of very weak signals. To maintain the output of mixer 10 in the narrow pass band of filter 18 is, of course, the problem and requires that drivers 14 and 16 cause the signal of oscillator 12 to vary in such a way as to substantially duplicate the video doppler input signal from the range bin being examined, or in other words, that the acceleration driver match the acceleration characteristics of the target and that the velocity driver match the period-starting velocity of the target.

Figure 2:
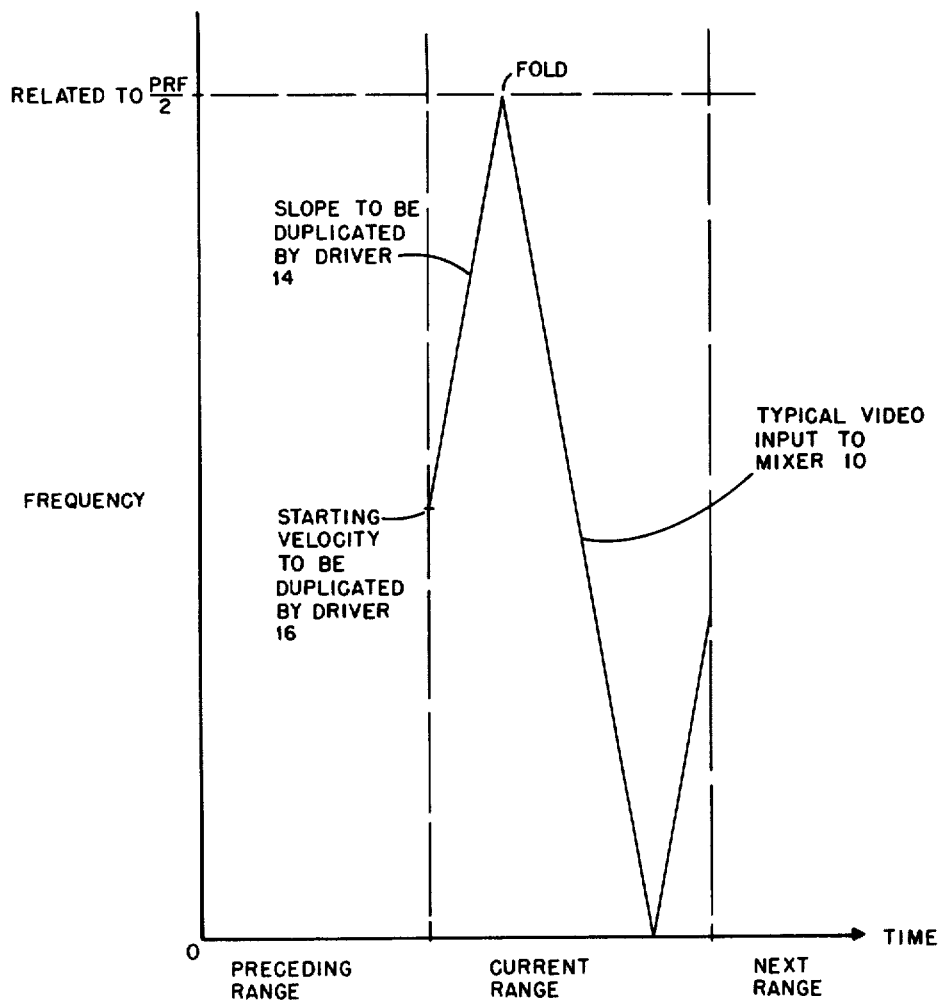
FIG. 2 is a diagram which is helpful in explaining the "folding" that occurs in the receiver when the doppler frequency exceeds one half of the pulse repetition frequency.

FIG. 2 diagrammatically represents a typical video doppler input signal to mixer 10 over the storage period in one range bin for a high acceleration target, such as an ICBM. As is discussed in more detail in patent application, Ser. No. 790,503 filed on Dec. 24, 1968 by Garold K. Jensen for HIGH FREQUENCY RADAR, it can be shown by Fourrier expansion techniques that the transmitted and received radar pulses of energy at a r-f of $f_o$ is a frequency spectrum having components $f_o \pm n\text{PRF}$, where $n$ represents the integers. The "folding", i.e. direction reversal, in the signal of FIG. 2 occurs as a result of combining the $f_o \pm n\text{PRF}$ spectrum, which is shifting because of the doppler effect of the accelerating target, with a fixed reference frequency, i.e. the local oscillator used in the receiver to convert from r-f to video and of retaining an unambiguous doppler frequency extent which is related to ½ PRF.

The invention attempts to duplicate the folding video signal of FIG. 2 which results from combining a shifting spectrum with a fixed frequency, with the combination of a fixed frequency spectrum and a variable frequency signal. The invention further provides for the further combination of the fixed frequency spectrum and the variable frequency signal with 100 other fixed frequency signals, which are representative of 100 different velocities, to thereby allow the use of 100 paralleled velocity analyzer channels and thus reduce the signal processing time.

Figure 3:
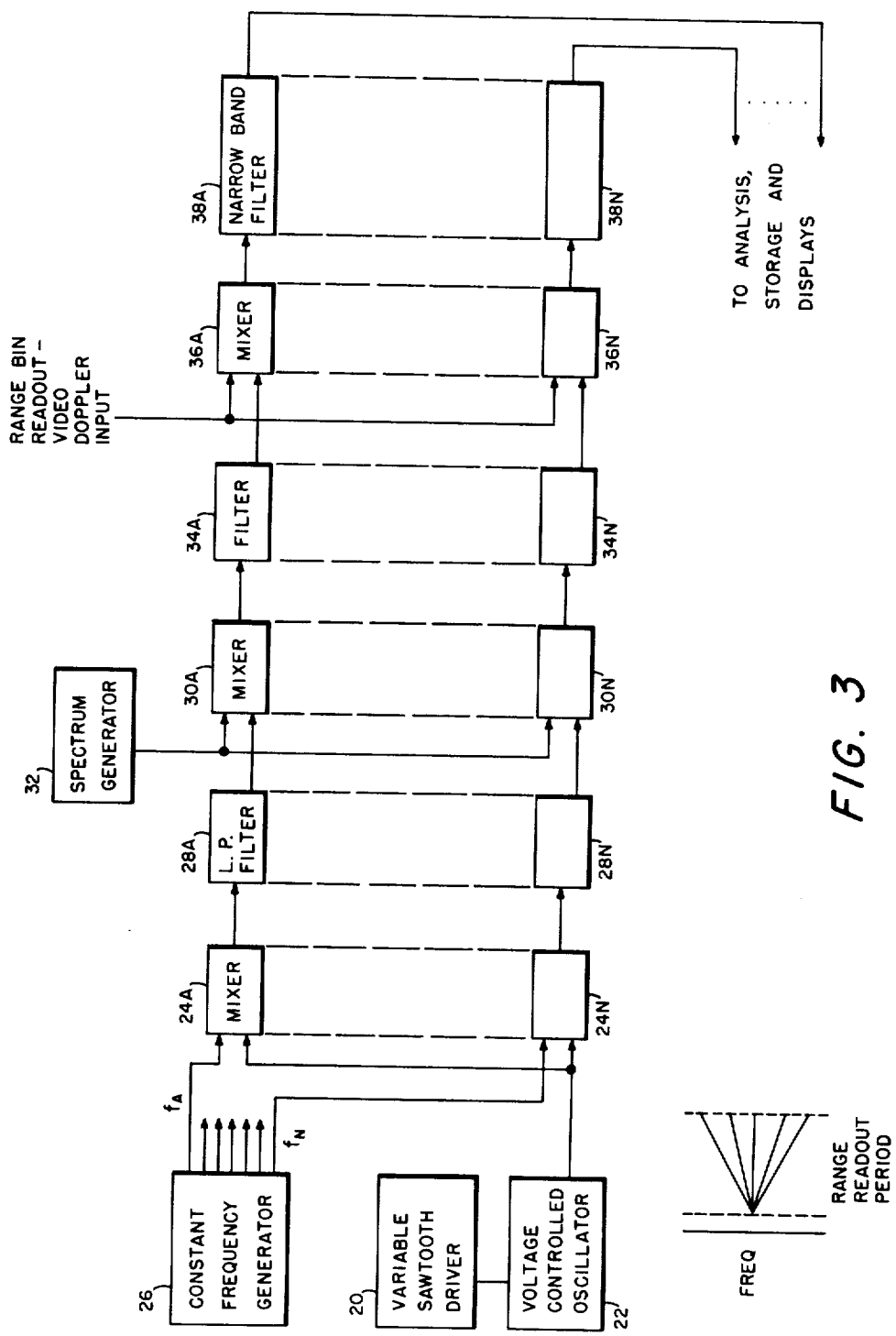
FIG. 3 is a block diagram of one embodiment of the invention.

An embodiment of the invention is shown in block diagram form in FIG. 3. Variable sawtooth driver 20 controls the oscillator 22 to generate the variable positive and negative slope frequency sweeps shown, the period of each sweep being equal to the duration of the readout from a signal storage range bin. The output signal of oscillator 22 is combined in mixers 24A . . . N (where N is typically 100) with N different constant frequency signals $f_A$ . . . $f_N$ produced by generator 26. This generator may either be in the form of N individual generators or any suitable one of other well known compound generators, some of which include a plurality of different frequency crystal filters which are excited by a spectrum generator.

The output signals of mixers 24A . . . N are connected through low pass filters 28A . . . N to mixers 30A . . . N where they are combined with the frequency spectrum signal produced by generator 32. This frequency spectrum signal contains the same (or related) frequency components that are contained in the transmitter pulse, and as previously mentioned, can be briefly described as including frequency components $f_o$ and $f_o \pm f_{PRF}$ having a sin $x/x$ type amplitude envelope that is often further modified by a $\cos^2$ time weighing in order to reduce the amplitude of the side-lobes. The output signals of mixers 30A . . . N are connected through filters 34A . . . N to mixers 36A . . . N where they are combined with the video doppler input signal from the signal storage range bins. The reader will of course recognize this mixing stage as being analogous to that performed in mixer 10 of FIG. 1. Similarly analogous to the prior art acceleration gate of FIG. 1, the mixers 36A . . . N are connected to narrow band filters 38A . . . N which are in turn connected to the radar analysis, storage and display sections which are not shown and which are not, per se, part of this invention.

The concept and operation of the invention of FIG. 3 is by now, no doubt, apparent. Oscillator 22 functions analogously to the oscillator 12 and ramp driver 14 of FIG. 1 to produce frequency sweeps which vary in slope with the intent that one of the slopes will duplicate the slope of the video doppler input signal, such as is shown in FIG. 2. In further analogy to FIG. 1, and particularly the oscillator 12 and step driver 16, the constant frequency generator 26 produces N (100) constant frequency signals with the intent that one of these signals will duplicate the starting velocity doppler frequency (velocity bin frequency) of the video doppler input signal, such as is shown in FIG. 2. However, an important difference between the prior art of FIG. 1 and the invention of FIG. 3 should be emphasized. In contrast to FIG. 1 where the signal can be matched only to the first fold which limits both the integration time and the signal recovery capacity of the radar, in FIG. 3 the N (100) constant frequency signals and parallel mixing channels allow a signal folded many times to be matched and thus allows integration to proceed during the entire range bin readout period with an attendant increase in radar signal recovery capability (increased radar range capability) and also makes possible a speed up in the signal processing time. When the appropriate combination of frequency sweep slope from oscillator 22 and velocity bin frequency from generator 26 is combined in mixer 30 with the frequency spectrum from generator 32, there will result a signal which, after being subtracted in mixer 36 from the video doppler input signal (FIG. 2) will pass in whole (or substantial part) through the narrow band filter 38. Because the signal energy from even highly accelerating targets, which will be folded many times, will be confined to one analyzing channel (one filter 38), the invention of FIG. 3 makes possible the recovery of very weak signals which would hitherto have been lost, or in other words, extends the effective range of the o-t-h radar.

The embodiment of FIG. 3 is particularly suitable for use in o-t-h radar where the range bins are read out in sequence, as is customary when the signal storage device is a revolving magnetic drum. However, there has recently been developed a capacitor matrix signal storage device which allows the range bins to be read out in parallel and thereby reduces the signal processing time. The embodiment of the invention illustrated in FIG. 4 is suited for use in radar wherein the range bins are read out in parallel.

Figure 4:
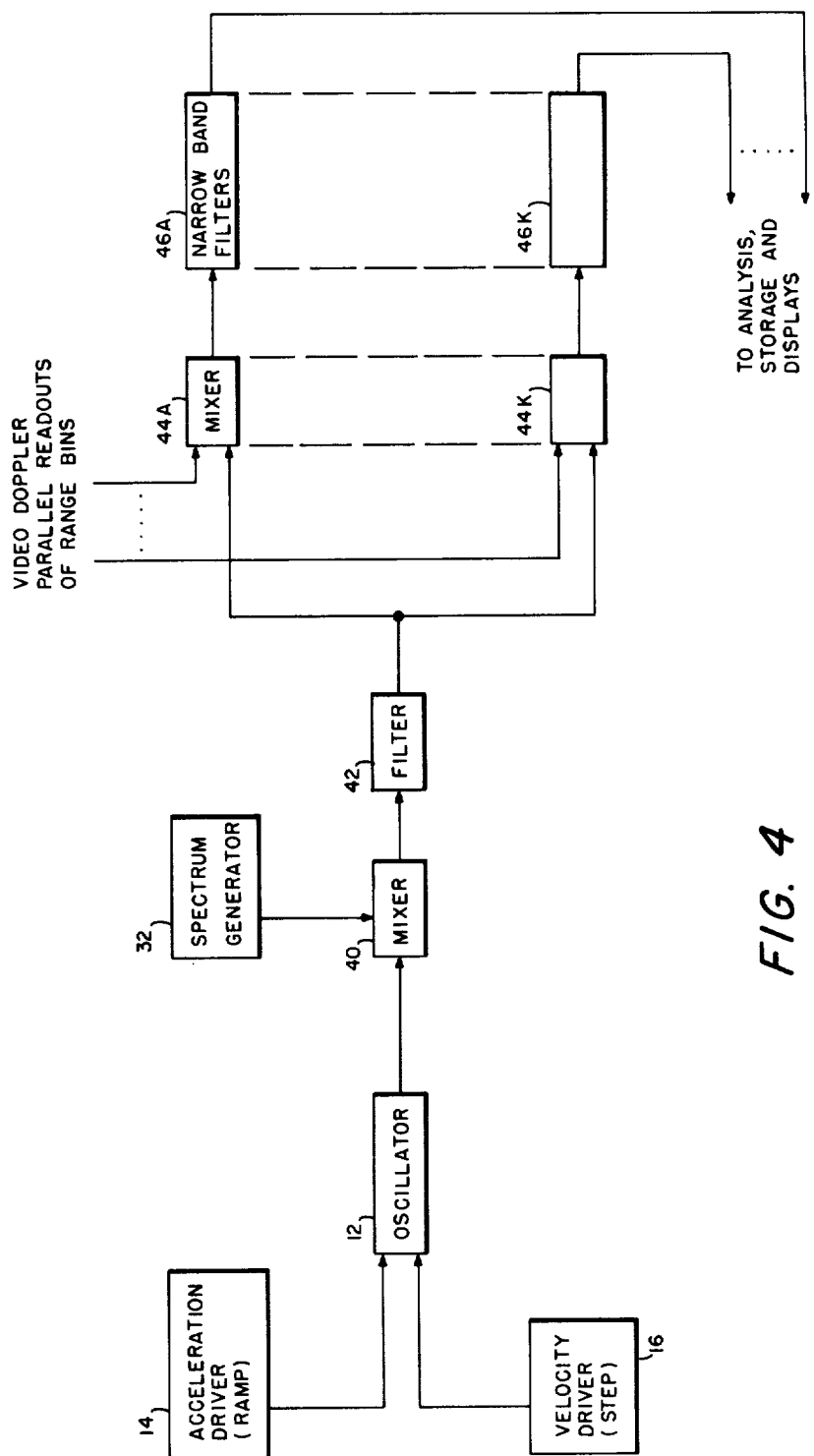
FIG. 4 illustrates another embodiment of the invention.

In FIG. 4 ramp driver 14 and step driver 16 control oscillator 12, as previously discussed in connection with FIGS. 1 and 3, to impress characteristics relating to target acceleration and velocity on the oscillator signal. In FIG. 4 the output signal of oscillator 12 is combined in mixer 40 with the frequency spectrum produced by generator 32, the operation of which has previously been discussed in connection with the embodiment of FIG. 3. Mixer 40 is connected through filter 42 to parallel mixers 44A . . . K (where K is typically 25) in which the signal is combined with individual video doppler signals from the parallel range bin readouts of the signal storage device, typically a capacitor matrix storage device. The outputs of mixers 44A . . . K are connected to narrow band filters 46A . . . K which function in a manner similar to previously discussed filters 18 and 38. Filters 46A . . . K are in turn connected to the analysis, storage and display sections of the radar.

The operation of the embodiment of FIG. 4 is advantageously similar to that of the embodiment of FIG. 3 in that the appropriate combination of the slope or acceleration characteristics from ramp driver 16 and the constant frequency or velocity characteristics from step driver 16 with the frequency spectrum from generator 32 is intended to match even multi-folded video doppler signals (such as is shown in FIG. 2) from the range bin readout. It will also be apparent that the embodiment of FIG. 4 is further functionally advantageous in that the parallel analysis of the video doppler range bin readouts permits a speed up in the radar signal processing.

Readers will by now realize that there has been disclosed an improved oscillator system wherein a fixed frequency spectrum is combined with a variable sweep rate signal to duplicate the spectral folding that occurs in radar receivers when the doppler frequency exceeds one half of the pulse repetition frequency.

It should be understood, of course, that the foregoing disclosure relates to only preferred embodiments of the invention and that numerous modifications or alterations may be made therein without departing from the spirit and the scope of the invention as set forth in the appended claims.

What is claimed and desired to be secured by Letters Patent of the United States is:

1. An oscillator system particularly suited for use in a radar which transmits pulses of energy having a frequency $f_o$ at a pulse repetition frequency $f_{PRF}$, comprising:

Oscillator means producing an oscillator signal which is varied in frequency in a manner related to the doppler video signal in said radar for anticipated targets;

Spectrum generator means producing a fixed frequency spectrum signal having frequency components related to $f_o$ and $f_o \pm nf_{PRF}$ where $n$ is an integer and Combining means for combining said oscillator signal and said fixed frequency spectrum signal.

2. An oscillator system particularly suited for use in a radar which transmits pulses of energy having a frequency $f_o$ at a pulse repetition frequency $f_{PRF}$, comprising:

Signal producing means for producing sequential signals which are varied in frequency in a manner related to the doppler video signals in said radar for differing anticipated targets;

Spectrum generator means producing a fixed frequency spectrum signal having frequency components related to $f_o$ and $f_o \pm nf_{PRF}$ where $n$ is an integer and Combining means for combining said sequential signals and said fixed frequency spectrum signal.

3. The oscillator system of claim 2 wherein said signal producing means is an oscillator which is controlled by a ramp driver and by a step driver.

4. The oscillator system of claim 2 wherein said signal producing means includes a generator which produces a plurality of constant frequency signals and a voltage controlled oscillator which is controlled by a variable sawtooth driver.

5. In a radar which transmits pulses of energy having a frequency $f_o$ and a pulse repetition frequency $f_{PRF}$ and wherein the receiver doppler video signal is stored in and read out from range bins, an oscillator and signal recovery system comprising:

Oscillator means producing an oscillator signal which is varied in a manner related to the doppler video signal in said radar for anticipated targets;

Spectrum generator means producing a fixed frequency spectrum signal having frequency components related to $f_o$ and $f_o \pm nf_{PRF}$ where $n$ is an integer;

First combining means for combining said oscillator signal and said fixed frequency spectrum signal and producing a first combining means output signal;

Second combining means connected to said first combining means for combining said first combining means output signal and the read out from said range bins and for producing a second combining means output signal and Narrow band filter means connected to receive said second combining means and to pass only that portion of said second combining means output signal which is within a predetermined narrow frequency band.

6. The apparatus of claim 5 wherein said oscillator means includes an oscillator controlled by a ramp driver and by a step driver and wherein said range bin readout is in the form of simultaneous, parallel signals.

7. The apparatus of claim 5 wherein said oscillator means includes a generator which produces a plurality of constant frequency signals and a voltage controlled oscillator which is controlled by a variable sawtooth driver and wherein said range bin readout is in the form of sequential signals from different range bins.

* * * * *